March 9, 1937.                H. L. WEBB                2,073,187
SPRINKLING DEVICE
Filed Oct. 21, 1936
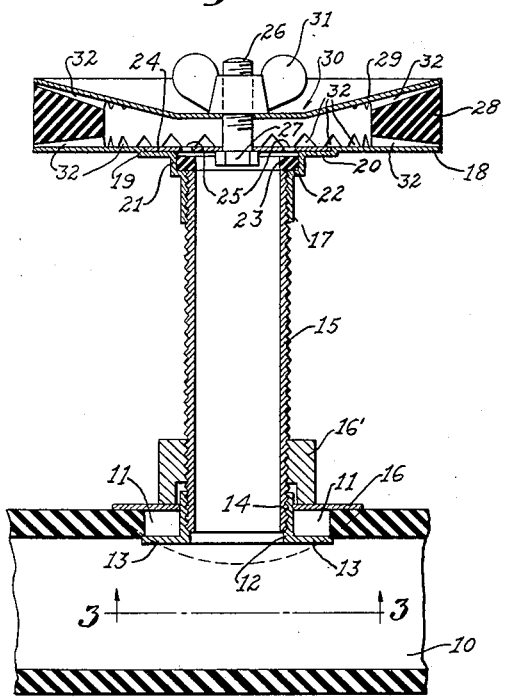
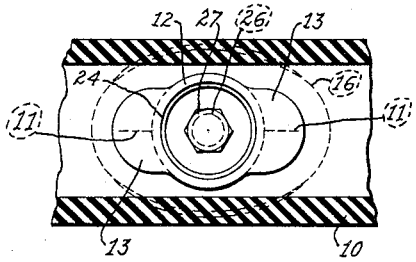
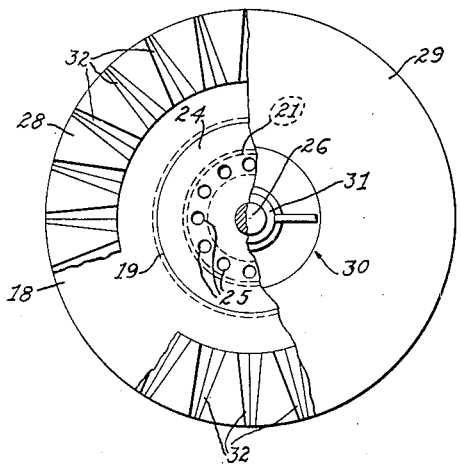
INVENTOR
H. L. WEBB
BY J. S. Cook
ATTORNEY Patented Mar. 9, 1937

2,073,187

UNITED STATES PATENT OFFICE 2,073,187

SPRINKLING DEVICE

Harold L. Webb, Webster Groves, Mo.

Application October 21, 1936, Serial No. 106,740

5 Claims. (Cl. 299—106)

This invention relates to improvements in sprinkling devices, and has for one of its objects the production of an inexpensive, but highly efficient, sprinkling device which may be regulated so as to discharge a rather heavy spray of water or a fine mist, one of the water discharge outlets being at the top portion of the sprinkler head and the other at the bottom portion of said sprinkler head, and the volume of flow of the water through the discharge ports being controllable by the adjustment of the top cap of the sprinkler head.

Another object of the invention is to provide sprinkling devices adapted to be attached at intervals along a hose or pipe to provide a plurality of sprays each one of which can be so adjusted as to insure uniform sprinkling at each spraying device, or each device may be so adjusted as to deliver a relatively heavy or fine spray. This is particularly important, as certain sections of a garden or lawn need more water than others. Also by my invention an upwardly directed spray, as well as a horizontally directed spray, are obtained at the same time, whereby water is thrown upon the leaves of growing plants by the upwardly directed spray, and at the same time the ground around the base of the plants is sprayed by the horizontal spray.

Another object of my invention is to produce a sprinkling device that may be quickly applied and easily adjusted as to volume of spray, or may be closed off entirely.

Other objects and advantages of my invention will be apparent from the following specification and accompanying drawing.

Fig. 1 is a vertical, sectional view of my improved sprinkling device.

Fig. 2 is a top plan view of my improved sprinkling device, with parts broken away.

Fig. 3 is a transverse section taken on line 3—3 of Fig. 1, looking in the direction of the arrows.

In the drawing a hose 10 is shown, to which a plurality of my devices may be attached for delivering sprays of water at spaced intervals along the length of the hose. A hole is provided in the hose 10, and also two slits 11 are provided in said hose, the slits 11 extending a short distance longitudinally of said hose from said hole for a purpose to be hereinafter described.

A base 12 is provided having two ears 13 projecting outwardly from the bottom portion of said base. This base is screw-threaded as at 14 to receive a threaded tube 15, which may be threaded throughout its entire length. The ears 13 and the lower portion of the base 12 are adapted to be inserted into the hose 10 through the hole in said hose and the slits 11. When this is done a curved cap member 16, which is provided with a central opening by which it may snugly fit around the outer, upper face of the base 12 and which is of sufficient area to cover the hole and the slits 11 in the hose 10, is inserted over the tubular member 15. A nut 16' is then screwed down over the tube 15 until it contacts with the upper face of the cap member 16 and is tightly screwed thereagainst, so as to force the base 12 and ears 13 into firm engagement with the inner face of the hose 10.

To the outer end of the tube 15 is threaded a lower spray cap member 17, which is preferably stamped from a single piece of material, and is formed of a circular member 18. Near the center of said member 18 a circular abutment 19 is provided to form a shelf 20. Still nearer the center is formed another abutment 21 on said member 18 to provide a relatively narrow shelf 22, which latter shelf 22 merges into the threaded, lower end of the tube cap member 17. A circular rubber or leather washer 23 is placed on the shelf 22 and extends over the upper edge of the tube 15, so that said washer may be moved upwardly against the circular plate 24 hereinafter referred to, and for a purpose that will be hereinafter described.

A circular plate 24 is firmly secured onto the shelf 20 and held tightly thereto by the edge of said plate 24 fitting tightly against the circular abutment 19. In the plate 24 above the top of the washer 23 are a series of holes 25 through which the water may pass from the tube 15. In Fig. 1 the washer 23 is shown out of contact with the underside of the plate 24, so that the water from the tube 15 may pass through the said holes 25. When the tube 15 is screwed upwardly the washer 23 is also moved upwardly, and when said tube 15 is sufficiently moved upwardly said washer 23 will impinge against the underface of the plate 24 and cut off the flow of water through said holes 25. Through the center of the circular plate 24, through a hole provided for the purpose, passes a bolt 26, the head 27 of which is preferably secured to the inner side of the circular plate 24.

A compressible gasket 28 of circular shape is placed upon the circular member 18 and is held in position by an upper cap member 29, which is preferably saucer shaped as shown at 30. The outer edges of this spray cap member 29, the gasket 28, and the lower spray cap member 18 are preferably in alinement, as seen in Fig. 1.

The bolt 26 passes upwardly through a hole in the center of the upper cap member 29 and has a wing-nut 31 threaded thereon to hold the upper cap member 29 in position and to adjust the same. The gasket 28 has transverse grooves 32 spaced about its upper and lower faces. These grooves are preferably deeper at their inner ends. The gasket 28 is made of compressible material, such as rubber, or a compounded material.

The water flows upwardly from the hose 10 through the tube 15 and holes 25 to reach the spray outlets 32 in the gasket 28. To regulate the size of the spray both through the upper and lower grooves 32, the wing-nut 31 is screwed either up or down, depending on whether a fine or coarse spray is desired. When screwed down a certain distance the gasket 28 is compressed between the upper and lower cap members 29 and 17, respectively, which contracts the grooves 32, thereby reducing the volume of water passing therethrough. Such contraction can be had as to reduce the flow of water until only a fine mist is obtained. If the wing-nut 31 is screwed down sufficiently the grooves 32 will be closed entirely and the flow of water cut off.

It will be noted that by the saucer shape of the upper cap member 29 an upwardly directed spray of water is thrown out by my sprinkling device, and with the flat lower cap member 17 a horizontally directed spray of water is obtained. Preferably these sprinkling devices are located a sufficient distance from each other so that the entire lawn or garden surface may be covered.

If desired the hose 10 with the sprinkling devices applied thereto may be buried in the ground, leaving the upper portions of the sprinkling devices protruding above the ground, or the hose may be left on top of the ground and secured against displacement in any well known manner.

I claim:

1. In a water sprinkling device, a base adapted to be mounted in a hose, a tubular member secured to said base, a sprinkler head mounted on said tubular member and comprising an upper and a lower cap member with a transversely grooved, compressible gasket circumferentially interposed between said upper and lower cap members, and means for compressing said gasket to vary the discharge of water through said grooves in said gasket.

2. In a water sprinkling device, a base adapted to be mounted in a hose, a tubular member secured to said base, a sprinkler head mounted on said tubular member and comprising a lower cap member and an upper cap member angularly inclined with respect to the lower cap member, a transversely grooved, compressible gasket circumferentially interposed between said lower and upper cap members, and means for compressing said gasket to vary the discharge of water through said grooves in said gasket.

3. In a water sprinkling device, a base adapted to be mounted in a hose, a tubular member secured at one end to said base, a sprinkler head mounted on the other end of said tubular member and comprising a lower cap member and an upper cap member angularly inclined with respect to the lower cap member, whereby two separate sprays of water at different angles may be directed from said sprinkling device, a grooved, compressible gasket circumferentially interposed between said lower and upper cap members, a bolt passing through said lower and upper cap members, and a nut on said bolt for securing said cap member together and to compress said gasket to regulate the volume of spray passing from said sprinkling device.

4. In a sprinkling device adapted to be attached to a hose for water, an attaching base, means for securing said base to said hose, a tubular member carried by said base, said sprinkling device comprising upper and lower cap members separated from each other by a circumferentially placed, compressible gasket having grooves therein for the passage of water therethrough, said upper and lower cap members being so arranged as to direct two separate sprays of water at different angles to each other, means for holding said cap members together and to compress said gasket therebetween, and a section in said lower cap member perforated to admit water from the tubular member to the space between the upper and lower cap members to be discharged from the sprinkling device.

5. In a water sprinkling device, a base adapted to be mounted in a hose, a tubular member secured at one end to said base, a sprinkler head mounted on the other end of said tubular member and comprising an upper cap member and a lower cap member with a transversely grooved, compressible gasket circumferentially interposed between said upper and lower cap members, said lower cap member being perforated to admit water from said tubular member to said transversely grooved gasket, a washer interposed between the top of said tubular member and the lower face of said lower cap member and said washer being adapted when moved upwardly to impinge against the lower face of said lower cap member to shut off the flow of water through said perforations in said lower cap member, and means for vertically moving the upper cap member to cause said gasket to be compressed to vary the discharge of water through said grooves in said gasket.

HAROLD L. WEBB.